Patented Sept. 26, 1944

2,358,775

UNITED STATES PATENT OFFICE 2,358,775

PRODUCTION OF UNSATURATED CARBOXYLIC ACIDS

Harry de V. Finch, Berkeley, and Theodore W. Evans, Oakland, Calif., assignors to Shell Development Company, San Francisco, Calif., a corporation of Delaware No Drawing. Application October 5, 1942, Serial No. 460,916

9 Claims. (Cl. 260—537)

This invention relates to the catalytic oxidation of organic halides. More particularly, it pertains to the production of unsaturated carboxylic acids from saturated or unsaturated halides. In one of its specific embodiments, the invention comprises the oxidation of 2-chlorobutene-2 to fumaric acid.

It has now been found, according to the present invention, that saturated and/or unsaturated organic halogen-containing compounds may be catalytically oxidized to unsaturated carboxylic compounds. The substances which are particularly applicable as starting material for the present process are organic mono- and polyhalides, especially those having at least one halogen atom attached to a non-terminal carbon atom. This halogen-containing carbon atom may be in an open or closed chain. Of the starting compounds, those halides in which a hydrogen atom is joined to a carbon atom adjacent to the halogen containing carbon atom are preferred. Compounds containing an open chain of at least four carbon atoms, to at least one of which a halogen atom is joined, constitute a particularly favored group of starting material. Of these, those halides which consist of a chain of but four carbon atoms with a halogen atom attached to one of the non-terminal carbon atoms are especially adapted to the present process. It has been found that these four carbon atom halides, whether saturated or not, yield the unsaturated four carbon atom dicarboxylic acid, fumaric acid.

The removal of an atom of hydrogen and an atom of halogen from two adjacent saturated carbon atoms respectively, by one step of the present process, yields an unsaturated organic compound. In this case, as well as when starting with an unsaturated halide, it might be supposed that subsequent oxidation of the compound would be associated with the unsaturated linkage rather than resulting in the formation of one or more terminal carboxylic groups. However, by the present process, not only are terminal carboxylic groups formed, but a halogen atom or atoms are simultaneously removed from the halide and an olefinic linkage is formed or left intact.

This result was particularly unexpected in the case of vinyl type halides—that is, compounds in which the halogen atom is attached to an unsaturated carbon atom, as in 2-chlorobutene-2—since such compounds are extremely stable and the halogen atom is notoriously difficult to remove or react.

The preferred group of four carbon atom halides especially applicable as starting material comprises 2,3-dihalo butane, 2,2-dihalobutane, 1,3-dihalobutane, 1,2-dihalobutane, 2-halobutane, 2-halobutene-2, 3-halobutene-1, 1-halobutene-2, and the like. Higher homologues of these halides may also be used, in which case, in addition to removal of a halogen atom and the oxidation of at least one terminal carbon atom to a carboxylic group, the length of the carbon chain may be decreased by the present process so that an unsaturated carboxylic or dicarboxylic acid having a lesser number of carbon atoms than the starting halide may result. Thus, in the treatment of saturated and unsaturated halides containing a chain (or ring) of five or six or more carbon atoms, the four carbon atom fumaric acid may still result, if the process is continued beyond the initial reaction. Of the halides, the chloride, bromide and iodide are especially adapted as the starting material for this process.

The reaction is effected with a solid oxidation catalyst, the organic halide being at a temperature at which it is ordinarily in the vapor phase. That is, the halide is reacted as a gas or, as described below, the gaseous halide may, if desired, be dissolved in or bubbled through a suitable solvent containing the catalyst. In general, a temperature in the range of about 250° C. to about 450° C. is preferred, the optimum temperature, of course, varying for different compounds. Among oxidation catalysts, an especially favorable group are those comprising at least one reducible vanadium or molybdenum compound, particularly such oxygen-containing compounds as $V_2O_2$, $V_2O_3$, $V_2O_4$, $V_2O_5$, $MoO_2$ $Mo_2O_3$, $MoO_3$, $MoO_4+Sn(VO_3)_4$ and the mixed oxides of vanadium and molybdenum as well as oxides containing vanadium in combination with chromium, manganese, uranium, tungsten, or iron. The catalyst may be conveniently deposited on a suitable carrier or support, such as pumice, and the mixture of halide and air or oxygen (with or without a diluent), passed over it at the desired temperature. Or in the alternative, the catalyst bed may be pulverized and its powder dispersed through the reaction mixture as by a vapor or liquid current or by mechanical agitation. Or again, the starting material and catalyst may be dissolved in a suitable solvent such as glacial acetic acid or other (preferably substantially anhydrous) organic acid, and a stream of air or oxygen bubbled through the mixture.

A particularly effective catalyst for the present process has been found to be vanadium pentoxide. This was prepared according to the following procedure, although variations of this step will be suggested to those skilled in the art: 50 gm. of washed 4 to 10 mesh pumice were added to a solution of 10 gm. ammonium meta vanadate in boiling water. The mixture was slowly evaporated to dryness with constant stirring. The impregnated pumice was then heated in an air stream for three hours at 375° C. This treatment yielded a catalyst of dark brown vanadium pentoxide which was reduced to a mixture of the lower oxides with a gasoline vapor-air mixture. The finished catalyst contained 8.4% vanadium.

The process may be further illustrated by reference to its application to 2-chlorobutene-2. In the following experiments a catalyst bed 18 mm. in diameter by 20 cm. long, containing 22 gm. of catalyst, was used. The apparatus used for the oxidations consisted of a pyrex glass tube heated in an electrical furnace. The furnace temperature was regulated with a variable transformer and temperatures were measured with a chromel alumel thermocouple placed in the catalyst chamber. Air was metered through a flowmeter and mixed with liquid feed at the top of the catalyst. After the mixture was passed over the catalyst, the exit gases were scrubbed with water.

Example I

A mixture of 2-chlorobutene-2 vapor and air at an oxygen/chloride mol ratio of 25 to 1 was fed over vanadium oxide on pumice at 350° C. at a rate of 0.5 ft.³ of gas per cubic foot of catalyst per second. Condensable material was caught in appropriate traps and the product was purified. A white crystalline solid resulted, with melting point about 287° C., boiling point 291° C.; it was soluble in water, alcohol and acetone, and insoluble in ether. The fumaric acid produced, estimated by the barium salt, was 7.1 mol percent of the chloride fed.

Another particularly efficacious catalyst for the present process has been found to be molybdenum oxide and tin vanadate as shown by the following:

Example II

A mixture of 2-chlorobutene-2 and air at a chloride/air molar ratio of 1:160 was passed over a tin vanadate-molybdenum oxide catalyst (prepared according to British Patent 465,848) at a temperature of 375° C. as in the preceding example. A yield of 7.9% fumaric acid was obtained.

These yields may be increased by recirculation of the reaction mixture for the purpose of further conversion and by more precise adjustment of the contact time, concentration of feed material, etc., to obtain optimum conversion per pass.

It has also been found that the portion of organic by-products produced in the pyrolysis of dihalobutanes (particularly 2,3-dichlorobutane) to butadiene, which boils between about 50° C. and about 130° C. can be converted in large part to fumaric acid by the process of the present invention. It has been found that this group of substances obtained from dichlorobutane consists in large part of 2-chlorobutene-2 with lesser amounts of 3-chlorobutene-1, 1-chlorobutene-2 and unreacted dichlorobutane.

The cis form of 2-chlorobutene-2 boils at 70.4° C. and the trans form at 61.7° C. while crotyl chloride boils at about 83° C., 3-chlorobutene-1 at 63.5° C. and 2,3-dichlorobutane at 123° C. Consequently the larger amount of these chlorides may be vaporized between about 61° C. and about 71° C. However, it is generally preferable to utilize the whole mixture of substantially butadiene-free by-products with the exception of filterable condensation products or distillation residues. Also, since the allyl halides and paraffinic halides are more easily converted to fumaric acid than are the vinyl type halides, there is no advantage in eliminating the former from the feed on this account. These butadiene by-products may be withdrawn from the pyrolysis process in a continuous manner as they are formed, with or without fractionation, and directly subjected to the present process, or they may be stored en masse or after fractionation for a subsequent conversion to fumaric acid.

In addition to butadiene by-products as a source of the dihalo paraffin, the latter may also be obtained, for example, through the halogenation, particularly chlorination (by methods known to the art) of the appropriate hydrocarbons which may be secured, for instance, by the distillation of low boiling petroleum fractions. The process for the production of fumaric acid from four carbon atom halides as herein described, however, is not limited to any particular source of starting material.

We claim as our invention:

1. A process for the production of fumaric acid from 2-chlorobutene-2, which process comprises contacting a mixture of 2-chlorobutene-2 and oxygene in a mol ratio of about 1 to 25, with a vanadium pentoxide catalyst at a flow rate of about 0.5 cu. ft. of gas per cubic foot of catalyst per second, at a temperature of about 350° C., and separating the resulting fumaric acid.

2. A process for the production of fumaric acid from 2-chlorobutene-2, which process comprises contacting a mixture of 2-chlorobutene-2 and oxygen in a mol ratio of about 1 to 40 with a molybdenum oxide-tin vanadate catalyst, at a temperature of about 375° C., and at a flow rate of about 0.5 cu. ft. of gas per cubic foot of catalyst per second, and separating the resulting fumaric acid.

3. A process for the production of fumaric acid from 2-chlorobutene-2, which process comprises contacting a mixture of 2-chlorobutene-2 and oxygen with an oxygen-containing oxidation catalyst of molybdenum, effecting said contacting at a temperature of between about 250° C. and about 450° C., and separating the resulting fumaric acid.

4. A process for the production of fumaric acid from a 2-halo butene-2, which process comprises contacting a mixture of the 2-halo butene-2 and oxygen with an oxygen-containing oxidation catalyst of vanadium, effecting said contacting at a temperature of between about 250° C. and about 450° C., and separating the resulting fumaric acid.

5. A process for the production of fumaric acid which comprises separating a fraction boiling between about 60° C. and about 71° C. from the reaction products resulting from the pyrolytic conversion of dichlorobutane to butadiene, subjecting at least a portion of said fraction, at a temperature of between about 250° C. and about 450° C., to the action of oxygen in the presence of an oxygen-containing catalyst of a metal of the group consisting of molybdenum and vanadium, and recovering fumaric acid from the resulting reaction mixture.

6. A process for the production of fumaric acid which comprises separating a fraction boiling between about 50° C. and about 130° C. from the reaction products resulting from the pyrolytic conversion of dichlorobutane to butadiene, subjecting at least a portion of said fraction, at a temperature of between about 250° C. and about 450° C., to the action of oxygen in the presence of an oxygen-containing catalyst of a metal of the group consisting of molybdenum and vanadium, and recovering fumaric acid from the resulting reaction mixture.

7. A process for the production of fumaric acid which comprises separating a fraction boiling between about 50° C. and about 130° C. from the reaction products resulting from the pyrolytic conversion of a dihalobutane to butadiene, subjecting at least a portion of said fraction, at a temperature of between about 250° C. and about 450° C., to the action of oxygen in the presence of a solid oxidation catalyst, and recovering fumaric acid from the resulting reaction mixture.

8. A process for the production of fumaric acid which comprises oxidizing a halogenated hydrocarbon fraction consisting of a major amount of a 2-halo butene-2 and of minor amounts of a 3-halo butene-1, a 1-halo butene-2 and dihalobutanes, effecting said oxidation at a temperature of between about 250° C. and about 450° C. in the presence of a solid oxidation catalyst, and recovering fumaric acid from the resulting reaction mixture.

9. A process for the production of fumaric acid which comprises oxidizing a halogenated hydrocarbon selected from the group consisting of 2-halo butene-2, 3-halo butene-1, 1-halo butene-2 and dihalobutenes, effecting said oxidation at a temperature of between about 250° C. and about 450° C. in the presence of a solid oxidation catalyst, and recovering fumaric acid from the resulting reaction mixture.

HARRY DE V. FINCH.
THEODORE W. EVANS.